(12) United States Patent
Takao

(10) Patent No.: US 12,323,703 B2
(45) Date of Patent: Jun. 3, 2025

(54) IMAGE PICKUP APPARATUS CAPABLE OF FOCUSING ON A DETECTED OBJECT AREA, CONTROL METHOD OF IMAGE PICKUP APPARATUS, AND STORAGE MEDIUM

(71) Applicant: CANON KABUSHIKI KAISHA, Tokyo (JP)

(72) Inventor: Maiko Takao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/165,977

(22) Filed: Feb. 8, 2023

(65) Prior Publication Data
US 2023/0262330 A1   Aug. 17, 2023

(30) Foreign Application Priority Data

Feb. 14, 2022   (JP) .................. 2022-020418

(51) Int. Cl.
*H04N 23/67* (2023.01)
*H04N 23/611* (2023.01)

(52) U.S. Cl.
CPC ......... *H04N 23/672* (2023.01); *H04N 23/611* (2023.01)

(58) Field of Classification Search
CPC .. H04N 23/672; H04N 23/611; H04N 23/617; H04N 23/667; H04N 23/675
See application file for complete search history.

(56) References Cited

U.S. PATENT DOCUMENTS

| | | | |
|---|---|---|---|
| 2008/0284901 A1 | 11/2008 | Misawa | |
| 2015/0112128 A1* | 4/2015 | Yoshino | A61B 1/000095 600/103 |
| 2018/0249092 A1* | 8/2018 | Kuriyama | H04N 23/673 |
| 2019/0373170 A1* | 12/2019 | Fujita | H04N 23/6812 |
| 2021/0195113 A1* | 6/2021 | Tsubusaki | H04N 23/687 |
| 2021/0258501 A1* | 8/2021 | Ikeda | H04N 23/675 |

FOREIGN PATENT DOCUMENTS

| | | |
|---|---|---|
| JP | 2008287091 A | 11/2008 |
| JP | 2019-121860 A | 7/2019 |
| JP | 2021-173803 A | 11/2021 |

\* cited by examiner

*Primary Examiner* — Gevell V Selby
(74) *Attorney, Agent, or Firm* — Cowan, Liebowitz & Latman, P.C.

(57) ABSTRACT

An image pickup apparatus includes an image sensor, an object detecting unit configured to detect an object area based on image data output from the image sensor, a scene detecting unit configured to detect a specific scene based on the image data, and a control unit configured to perform focus control based on focus information on the object area. The control unit changes a selection method of the object area for acquiring the focus information according to whether the specific scene has been detected.

28 Claims, 12 Drawing Sheets

IMAGE PICKUP APPARATUS CAPABLE OF FOCUSING ON A DETECTED OBJECT AREA, CONTROL METHOD OF IMAGE PICKUP APPARATUS, AND STORAGE MEDIUM

BACKGROUND

Technical Field

One of the aspects of the disclosure relates to an image pickup apparatus, an image pickup apparatus control method, and a storage medium.

Description of the Related Art

Cameras having a focusing function (autofocus (AF)) for automatically adjusting a focus position of an imaging lens have recently become widespread. As the focusing method (AF method), various methods such as an imaging-plane phase-difference AF method using an image sensor and a contrast AF method have been reduced to practice. The various AF methods include technologies for specifying and focusing on a main object area.

Japanese Patent Laid-Open No. ("JP") 2019-121860 discloses a method for detecting an organ such as an eye included in a face, for determining the reliability of the detection result of the detected organ, and for setting a focus detecting area to an area having high detection reliability. JP 2021-173803 discloses a method for changing a focus detecting area according to a detected part of an object.

The methods disclosed in JPs 2019-121860 and 2021-173803 set only the detected part having a high priority to the focus detecting area in a case where the object detection is reliable. Thus, these methods cannot perform stable focus control in a specific scene in which a detected part having a high priority irregularly moves.

SUMMARY

One of the aspects of the embodiment provides an image pickup apparatus that can perform stable focus control in a specific scene.

An image pickup apparatus according to one aspect of the disclosure includes an image sensor, at least one processor, and a memory coupled to the at least one processor, the memory having instructions that, when executed by the processor, perform operations as an object detecting unit configured to detect an object area based on image data output from the image sensor, a scene detecting unit configured to detect a specific scene based on the image data, and a control unit configured to perform focus control based on focus information on the object area. The control unit changes a selection method of the object area for acquiring the focus information according to whether the specific scene has been detected. A control method of the above image pickup apparatus, and a storage medium storing a program that causes a computer to execute the above control method also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a detailed description will be given of embodiments according to the disclosure.

Configuration of Imaging System

Figure 1:
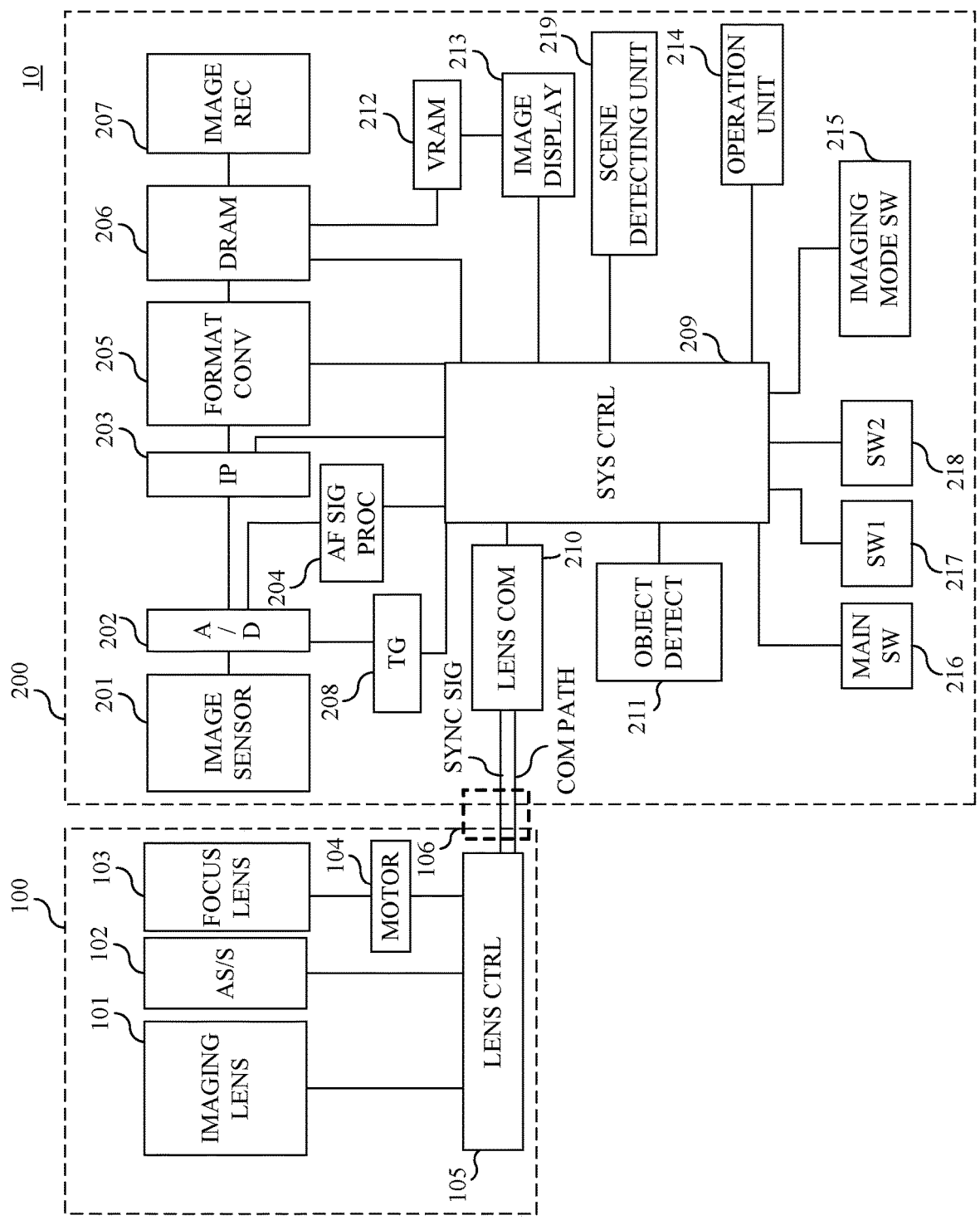
FIG. 1 is a block diagram of an imaging system according to this embodiment.

Referring now to FIG. 1, a description will be given of a configuration of an imaging system according to this embodiment. FIG. 1 is a block diagram of an imaging system 10. The imaging system 10 is a lens interchangeable type camera system that includes a camera body (image pickup apparatus) 200 and a lens apparatus (interchangeable lens) 100 that is attachable to and detachable from the camera body 200. However, this embodiment is not limited to this example, and is applicable to an image pickup apparatus in which a camera body and a lens apparatus are integrated with each other.

The imaging system 10 includes a focusing apparatus, and performs focusing using an imaging-plane phase-difference detecting method using an output signal from an image sensor 201 that captures an object image. In a case where the lens apparatus 100 is attached to the camera body 200 via a mount unit having an electric contact unit 106, a lens controller 105 and a system control unit 209 can communicate with each other.

The lens apparatus 100 includes an imaging lens 101 including a zoom mechanism, an aperture stop (diaphragm)/shutter (AS/S) 102 configured to control a light amount, a focus lens 103 configured to focus the image sensor 201 on an object, a motor 104 configured to drive the focus lens 103, and a lens controller 105. The lens controller 105 centrally controls the operation of the lens apparatus 100.

The camera body 200 can acquire an imaging signal from a light beam (luminous flux) that has passed through the optical system (imaging optical system) in the lens apparatus 100. The camera body 200 includes the image sensor 201 that photoelectrically converts light reflected from the object into an electric signal, an analog-to-digital (A/D) converter 202 that includes a correlated double sampling (CDS) circuit that removes output noise from the image sensor 201 and a nonlinear amplifier circuit that performs prior to the A/D conversion, an image processing unit (IP) 203, and an AF signal processing unit 204. The camera body 200 further includes a format converter 205, a high-speed built-in memory (for example, random access memory, referred to as DRAM hereinafter) 206, and an image recording unit 207 that includes a recording medium such as a memory card and its interface. The camera body 200 further includes a timing generator (TG) 208, the system control unit 209 that controls the system such as an imaging sequence, and a lens communication unit 210 that communicates between the camera body 200 and the lens apparatus 100. The system control unit 209 performs focus control based on focus information (focus detecting information) of an object area, and centrally controls the entire operation of the imaging system 10.

The camera body 200 further includes an object detecting unit 211, an image display memory (VRAM) 212, and a scene detecting unit 219. The object detecting unit 211 detects the object area based on image data output from the image sensor 201. The scene detecting unit 219 detects a specific scene based on image data output from the image sensor 201. In this embodiment, the specific scene is, but not limited to, a sports scene.

The camera body 200 further includes an image display unit 213 that displays an image, operation assistance, a camera status, an imaging screen, and a focus detecting area during image capturing. The camera body 200 further includes an operation unit 214 configured to enable a user to operate the camera body 200 from the outside, an imaging mode switch 215 configured to select an imaging mode such as a macro mode and a sports mode, and a main switch 216 configured to power on the system. The camera body 200 further includes a switch (SW1) 217 configured to perform an imaging standby operation such as AF and auto-exposure (AE), and an imaging switch (SW2) 218 configured to perform imaging after the SW1 is operated. The DRAM as the built-in memory 206 is used for a high-speed buffer as a temporary image storage and as a work memory for image compression and decompression. The operation unit 214 includes, for example, a menu switch for performing various settings such as the imaging function of the camera body 200 and settings during image playback, an operation mode switch for switching among an imaging mode, a playback mode, and the like.

The image sensor 201 is a photoelectric conversion element such as a CCD sensor or CMOS sensor. Each pixel of the image sensor 201 in this embodiment includes two (a pair of) photodiodes A and B and a single microlens for the pair of photodiodes A and B. Each pixel separates incident light with the microlens to form a pair of optical images on the pair of photodiodes A and B, and outputs a pair of pixel signals (A signal and B signal) for AF signals to be described below from the pair of photodiodes A and B. An imaging signal (A+B signal) can be obtained by adding the outputs from the pair of photodiodes A and B.

A pair of image signals as the AF signals (focus detecting signal) for AF by the imaging-plane phase-difference detecting method (imaging-plane phase-difference AF) can be acquired by combining a plurality of A signals and a plurality of B signals output from a plurality of pixels. The AF signal processing unit 204 calculates a correlation between a pair of image signals, calculates a phase difference (image shift amount) that is a shift amount between the pair of image signals, and calculates a defocus amount (and defocus direction and reliability) of the imaging optical system from the image shift amount. The AF signal processing unit 204 performs a plurality of calculations in a predetermined area where the defocus amount can be specified.

Operation of Imaging System

Figure 2:
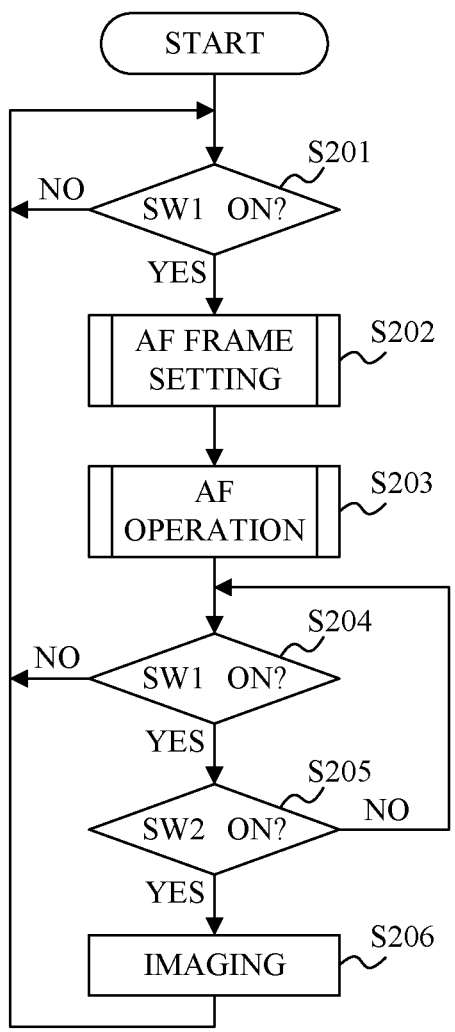
FIG. 2 is a flowchart of an operation of the imaging system according to this embodiment.

Referring now to FIG. 2, a description will be given of the operation of the imaging system 10 according to this embodiment. FIG. 2 is a flowchart of the operation of the imaging system 10, illustrating the flow of the imaging control processing in a case where still image is captured in a state in which a live-view image is displayed. The system control unit 209 that includes a computer executes this processing according to a control program as a computer program.

First, in step S201, the system control unit 209 determines whether SW1 (217) is turned on. In a case where SW1 (217) is turned off, the determination of step S201 is repeated. On the other hand, in a case where SW1 (217) is turned on, the flow proceeds to step S202. In step S202, the system control unit 209 performs AF frame setting (setting of focus detecting area), which will be described below, for the AF signal processing unit 204. Next, in step S203, the system control unit 209 performs an AF operation, which will be described below. Next, in step S204, the system control unit 209 determines whether SW1 (217) is turned on. In a case where SW1 (217) is turned on, the flow proceeds to step S205. On the other hand, in a case where SW1 (217) is turned off, the flow returns to step S201. In step S205, the system control unit 209 determines whether SW2 (218) is turned on. In a case where SW2 (218) is turned on, the flow proceeds to step S206. On the other hand, in a case where SW2 (218) is turned off, the flow returns to step S204. In step S206, the system control unit 209 performs an imaging operation, and returns to step S201.

AF Frame Setting

Figure 3:
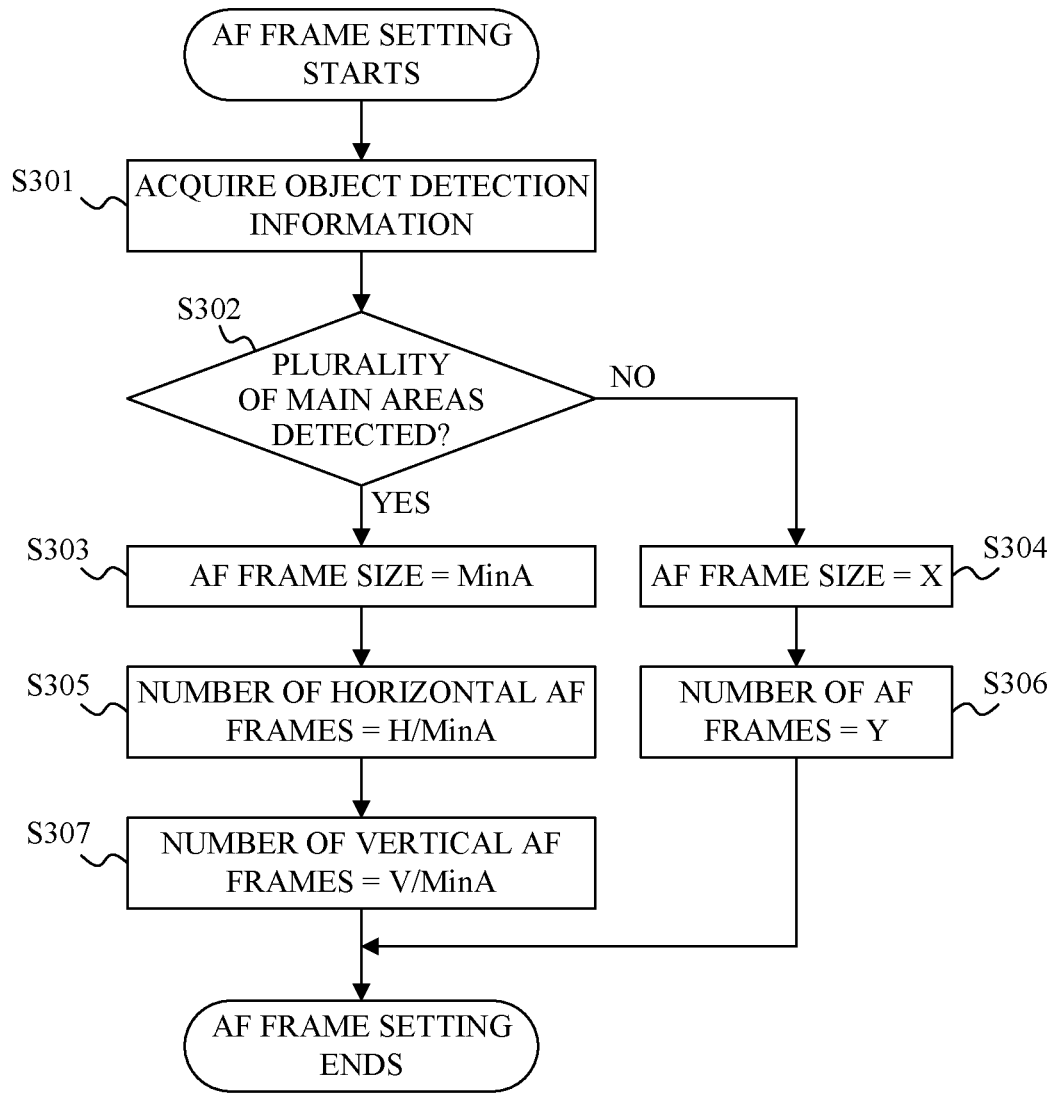
FIG. 3 is a flowchart of AF frame setting according to this embodiment.

Referring now to FIG. 3, a description will be given of the AF frame setting (step S202 in FIG. 2). FIG. 3 is a flowchart illustrating the AF frame setting. First, in step S301, the system control unit 209 acquires object detection information from the object detecting unit 211. An object in this embodiment is a person, and a main area (object area) within the object is to be detected. Here, the main area is the eyes, face, and body of a person or animal. They can be detected with a known learning method using machine learning, recognition processing using an image processing unit, or the like.

For example, the types of machine learning are as follows:
(1) Support Vector Machine
(2) Convolutional Neural Network
(3) Recurrent Neural Network One example method of the recognition processing is a method of extracting a skin color area from a gradation color of each pixel represented by image data, and of detecting a face based on the matching degree with a previously prepared face contour plate. Another well-known method is a method of performing face detection by extracting facial feature points such as the eyes, nose, and mouth using a known pattern recognition technology. The main area detecting method applicable to this embodiment is not limited to these technologies, and another technology may be used.

Next, in step S302, the system control unit 209 determines whether or not a plurality of main areas have been detected in the detection result of the object detecting unit 211. In a case where the plurality of main areas are detected, the flow proceeds to step S303. On the other hand, in a case where the plurality of main areas have not yet been detected (in a case where only a single main area has been detected), the flow proceeds to step S304.

Figure 4A:
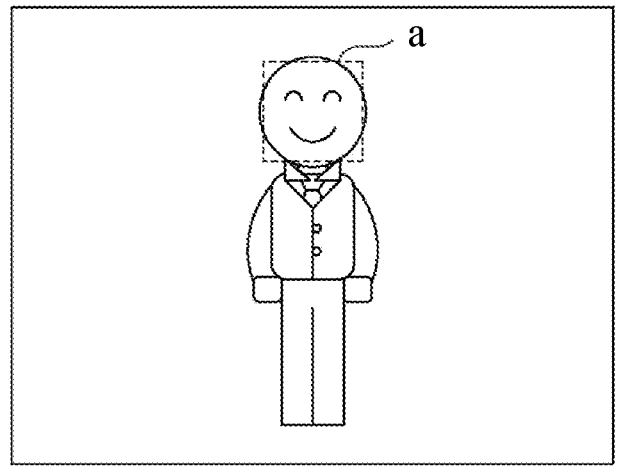
FIGS. 4A and 4B explain that only a single main area is detected in this embodiment.
Figure 4B:
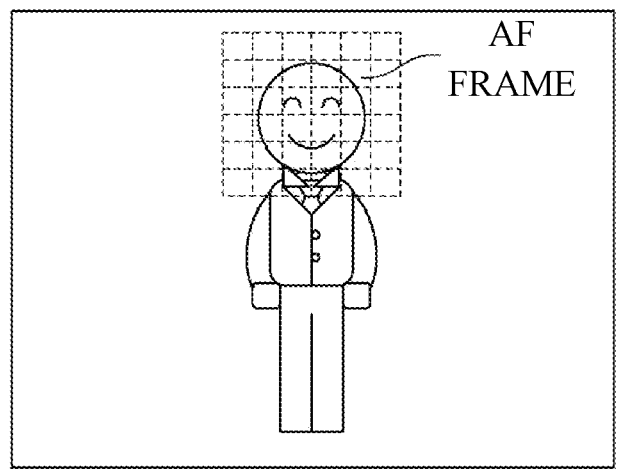
Figure 5A:
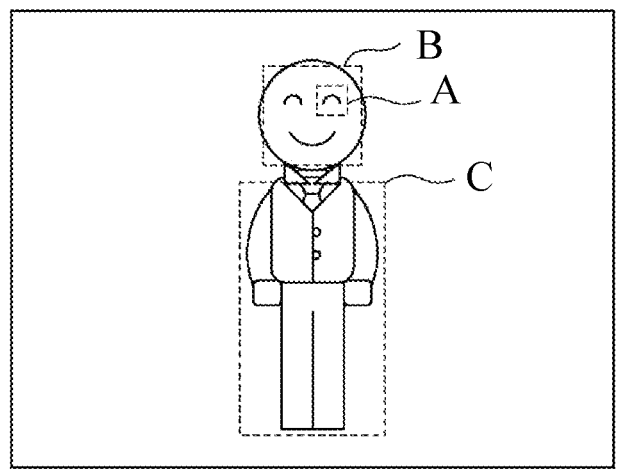
FIGS. 5A and 5B explain that a plurality of main areas are detected in this embodiment.
Figure 5B:
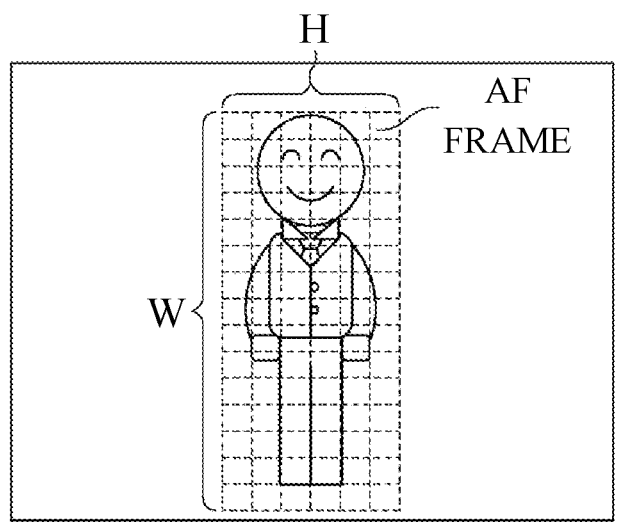

Referring now to FIGS. 4A, 4B, 5A, and 5B, a description will be given of a state in which the single main area is detected and a state in which the plurality of main areas are detected. FIGS. 4A and 4B explain the state in which the single main area is detected. FIGS. 5A and 5B explain the state in which the plurality of main areas are detected.

FIG. 4A illustrates a state in which a face "a" is detected (the state in which the single main area is detected). FIG. 5A illustrates a state in which an eye "A," a face "B," and a body "C" are detected (the state in which the plurality of main areas are detected). This embodiment assumes that the object detecting unit 211 can acquire the type of an object such as a person or an animal, center coordinates, the horizontal size (length), and the vertical size (length) in each detected main area.

In step S303, the system control unit 209 inputs the minimum detectable main area, that is, a smaller value of the horizontal size or the vertical size of the eye A in FIG. 5A to MinA, and sets MinA to one AF frame size. Next, in step S305, the system control unit 209 obtains a horizontal size H in FIG. 5B including all main areas from the horizontal coordinate and horizontal size of each detected main area. The system control unit 209 then divides the horizontal size H by the AF frame size MinA and determines the number of horizontal AF frames (H/MinA).

Next, in step S307, the system control unit 209 calculates the vertical size V in FIG. 5B including all main areas based on the vertical coordinate and vertical size of each detected main area. The system control unit 209 divides the vertical size V by the AF frame size MinA, determines the number of vertical AF frames (V/MinA), and ends AF frame setting. In this embodiment, the AF frame size is, but not limited to, a square area using the minimum size, but the horizontal and vertical AF frame sizes may be made different or the number of AF frames that can be calculated by the system control unit 209 may be set.

In step S304, the system control unit 209 sets to the detected face an AF frame having an AF frame size X, which is a predetermined size, as illustrated in FIG. 4B. An eye size estimated from the face may be set to the AF frame size X, or a frame size may be set to it such that a signal-to-noise (S/N) ratio can be secured and sufficient focusing performance can be obtained in consideration of the low illumination environment. This embodiment assumes that the AF frame size X is set to the estimated eye size. Next, in step S306, the system control unit 209 sets the number of AF frames Y so that the area of the face "a" is covered with the AF frame size X even in a case where the face moves, as illustrated in FIG. 4B.

AF Operation

Figure 6A:
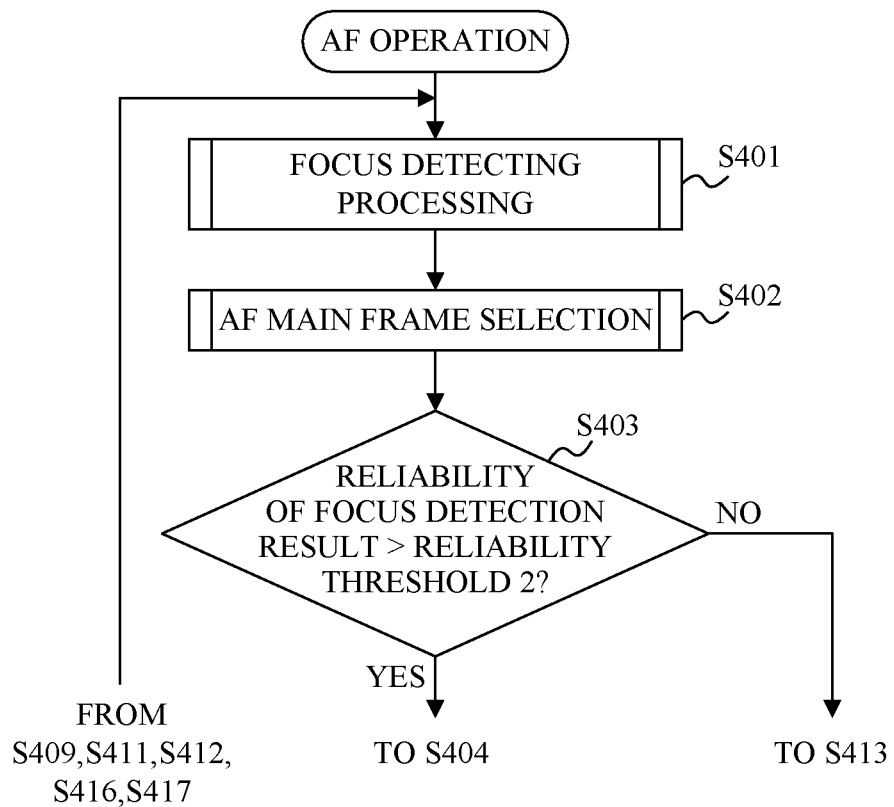
FIGS. 6A and 6B are flowcharts of an AF operation according to this embodiment.
Figure 6B:
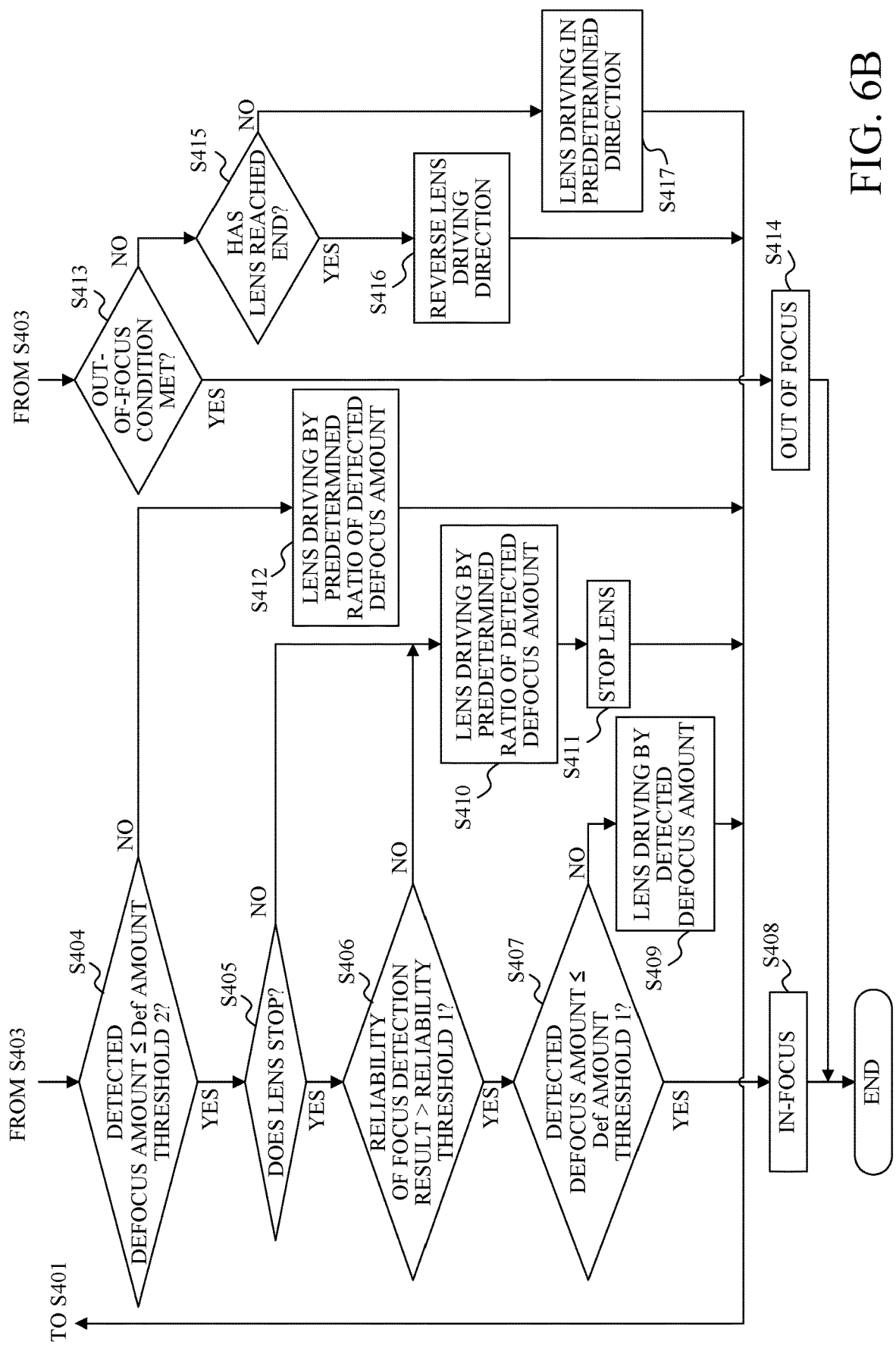

Referring now to FIGS. 6A and 6B, a description will be given of step S203 (AF operation) in FIG. 2. FIGS. 6A and 6B are flowcharts of the AF operation.

First, in step S401, the system control unit 209 performs focus detecting processing and detects the defocus amount and reliability. The focus detecting processing will be described below. Next, in step S402, the system control unit 209 uses the reliability obtained in step S401 and selects the AF main frame, which will be described below. Next, in step S403, the system control unit 209 determines whether or not the reliability of the focus detection result in step S401 is higher than a preset reliability threshold 2. In a case where the reliability of the focus detection result is higher than reliability threshold 2, the flow proceeds to step S404. On the other hand, in a case where the reliability of the focus detection result is lower than reliability threshold 2, the flow proceeds to step S413. Here, reliability threshold 2 is set to a threshold such that in a case where the reliability is less than the reliability threshold 2, the accuracy of the defocus amount cannot be guaranteed but the focus position direction of the object can be guaranteed.

In step S404, the system control unit 209 determines whether or not the defocus amount detected in step S401 is equal to or smaller than a preset Def amount threshold 2. In a case where the defocus amount is equal to or smaller than the Def amount threshold 2, the flow proceeds to step S405. On the other hand, in a case where the defocus amount is larger than the Def amount threshold 2, the flow proceeds to step S412. Here, the Def amount threshold 2 is set to a value (for example, an amount that is five times as large as the depth of focus) such that in a case where the defocus amount is equal to or smaller than the Defocus amount threshold 2, the focus lens can be thereafter controlled within the focal depth within a predetermined number of times (for example, three times) by driving the lens by the defocus amount.

In step S405, the system control unit 209 determines whether the focus lens 103 stops. In a case where the focus lens 103 stops, the flow proceeds to step S406. On the other hand, in a case where the focus lens 103 does not stop (in a case where the focus lens 103 is moving), the flow proceeds to step S410.

In step S406, the system control unit 209 determines whether the reliability of the focus detection result in step S401 is higher than a preset reliability threshold 1. In a case where the reliability of the focus detection result is higher than the reliability threshold 1, the flow proceeds to step S407. On the other hand, in a case where the reliability of the focus detection result is lower than reliability 1, the flow proceeds to step S410. Here, reliability threshold 1 is set to a value such that in a case where the reliability is equal to or higher than the reliability threshold 1, the variation in accuracy of the defocus amount is within a predetermined range (for example, within the depth of focus).

In step S407, the system control unit 209 determines whether or not the defocus amount detected in step S401 is equal to or lower than a preset Def amount threshold 1. In a case where the defocus amount is equal to or lower than the Def amount threshold 1, the flow proceeds to step S408. On the other hand, in a case where the defocus amount is higher than the Def amount threshold 1, the flow proceeds to step S409. Here, the Def amount threshold 1 is set to a value such that the focus lens is controlled within the depth of focus in a case where the detected defocus amount is equal to or lower than the Def amount threshold 1.

In step S408, the system control unit 209 determines the in-focus state and ends this flow. In step S409, the system control unit 209 drives the focus lens 103 by the defocus amount detected in step S401, and then the flow proceeds to step S401. By performing a series of processes in steps S405 to S409, the system control unit 209 can determine the in-focus state while the focus lens 103 is stopped in a case where the reliability detected in step S401 is higher than reliability threshold 1.

In step S410, the system control unit 209 drives the focus lens 103 by a predetermined ratio of the defocus amount detected in step S401. Next, in step S411, the system control unit 209 issues an instruction to stop the focus lens 103, and the flow proceeds to step S401. In step S412, the system control unit 209 drives the focus lens 103 by a predetermined ratio of the defocus amount detected in step S401 because the defocus amount is not equal to or smaller than the Def amount threshold 2, and then proceeds to step S401. Here, the predetermined ratio is set to a value such that the lens driving amount is smaller than the defocus amount (for example, 80%). The lens velocity is set to be lower than the velocity at which the lens can be driven in one frame, for example. This configuration can prevent the lens from exceeding the object in-focus position in a case where the detected defocus amount is incorrect. In addition, this configuration can perform the next lens while driving the focus lens 103 without stopping (overlap control).

In step S413, the system control unit 209 determines whether or not an out-of-focus condition is satisfied. In a case where the out-of-focus condition is satisfied, the flow proceeds to step S414. On the other hand, in a case where the out-of-focus condition is not satisfied, the flow proceeds to step S415. Here, the out-of-focus condition is a predetermined condition for determining that there is no object to be focused. For example, a condition is set such that lens driving is completed in the entire movable range of the focus lens 103, that is, the focus lens 103 detects both the far-side (infinity-side) and near-side (closest-side) lens ends and returns to the initial position.

In step S414, the system control unit 209 determines that it is out of focus, and ends this flow. In step S415, the system control unit 209 determines whether the focus lens 103 has reached the far-side or near-side lens end. In a case where the focus lens 103 has reached the lens end, the flow proceeds to step S416. On the other hand, in a case where the focus lens 103 has not reached the lens end, the flow proceeds to step S417.

In step S416, the system control unit 209 reverses the driving direction of the focus lens 103, and the flow proceeds to step S401. In step S417, the system control unit 209 drives the focus lens 103 in a predetermined direction, and the flow proceeds to step S401. The velocity of the focus lens 103 is set to the highest velocity within a range of lens velocity such that the focus lens does not pass the focus position in a case where the defocus amount becomes detectable, for example.

Focus Detecting Processing

Figure 7:
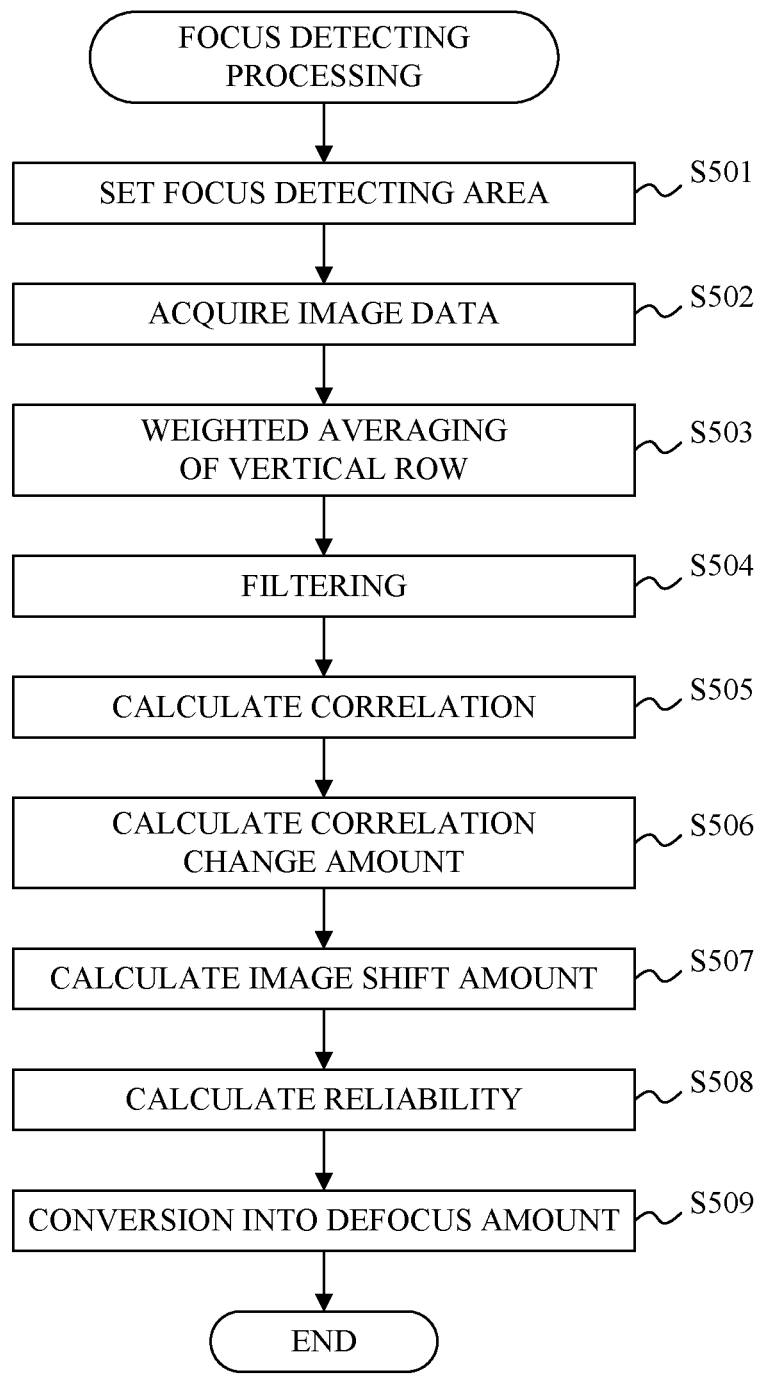
FIG. 7 is a flowchart of focus detecting processing according to this embodiment.

Referring now to FIG. 7, a description will be given of step S401 (focus detecting processing) in FIG. 6A. FIG. 7 is a flowchart of the focus detecting processing.

First, in step S501, the system control unit 209 sets a focus detecting area within an arbitrary range in the image data output from the image sensor 201. Next, in step S502, the system control unit 209 acquires the pair of image signals (A image signal and B image signal) for focus detection from the image sensor 201 corresponding to the focus detecting area set in step S501. Next, in step S503, the system control unit 209 performs row averaging processing in the vertical direction on the pair of image signals acquired in step S502. This processing can reduce the noise influence on the image signal. Next, in step S504, the system control unit 209 performs filter processing for extracting a signal component in a predetermined frequency band from the vertical row averaged signal in step S503.

Next, in step S505, the system control unit 209 calculates a correlation amount from the signal filtered in step S504. Next, in step S506, the system control unit 209 calculates a correlation change amount from the correlation amount calculated in step S505. Next, in step S507, the system control unit 209 calculates an image shift amount from the correlation change amount calculated in step S506. Next, in step S508, the system control unit 209 calculates the reliability indicating how reliable the image shift amount calculated in step S507 is. Next, in step S509, the system control unit 209 converts the image shift amount into a defocus amount, and ends focus detecting processing.

AF Main Frame Selection

Figure 8:
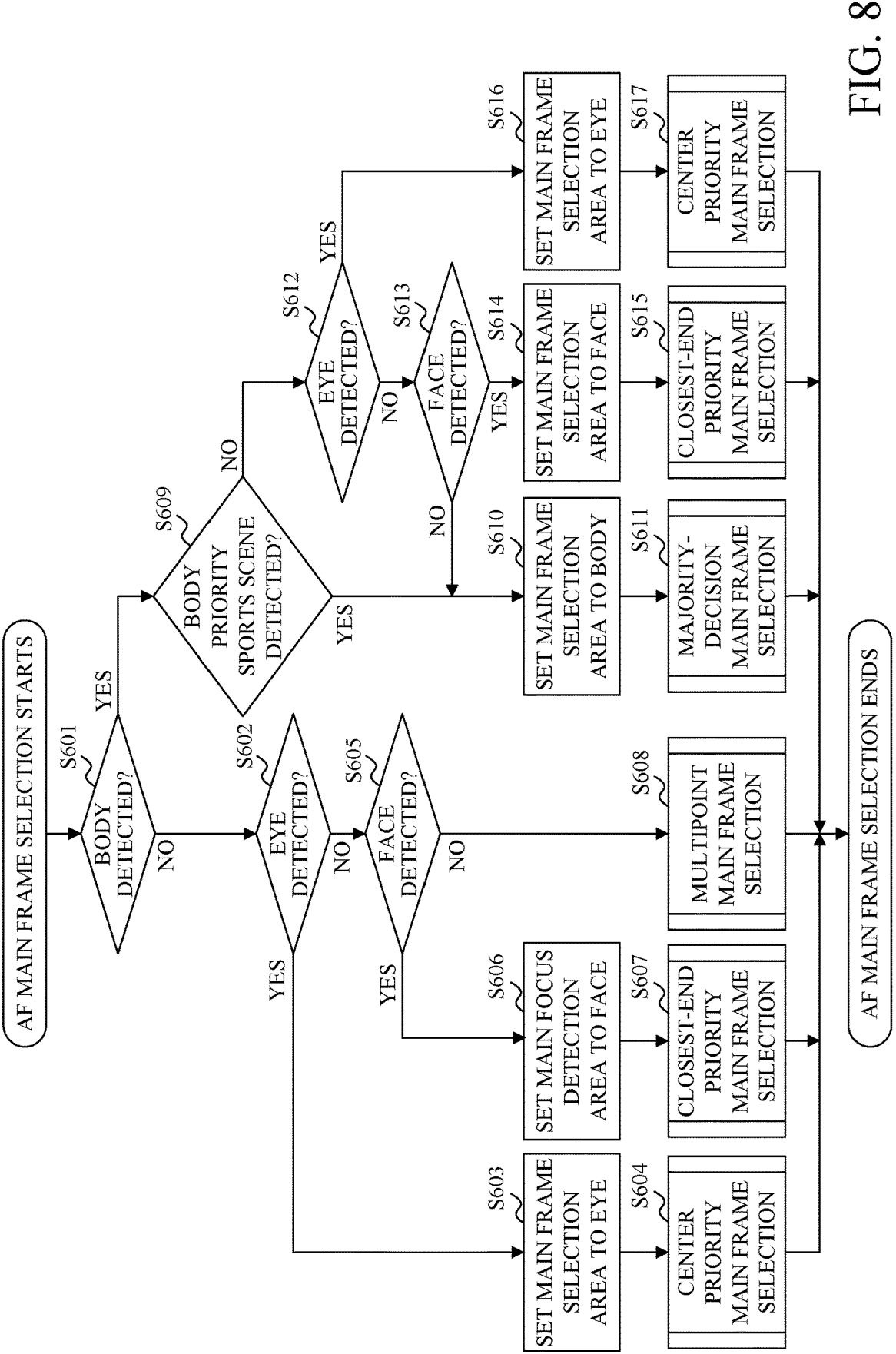
FIG. 8 is a flowchart of AF main frame selection according to this embodiment.

Referring now to FIG. 8, a description will be given of step S402 (AF main frame selection) in FIG. 6A. FIG. 8 is a flowchart of the AF main frame selection.

First, in step S601, the system control unit 209 determines whether the object detecting unit 211 has detected the body of the object. In a case where the body has been detected, the flow proceeds to step S609. On the other hand, in a case where the body has not yet been detected, the flow proceeds to step S602. In step S602, the system control unit 209 determines whether or not the eye of the object is detected by the object detecting unit 211. In a case where the eye has been detected, the flow proceeds to step S603. On the other hand, in a case where the eye has not yet been detected, the flow proceeds to step S605.

In step S603, the system control unit 209 sets the main frame selection area, which is a target area for selecting the AF main frame, to the eye detecting area. Next, in step S604, the system control unit 209 selects the main frame from the main frame selection area set in step S603 by center priority main frame selection, which will be described below, and ends the AF main frame selection processing.

In step S605, the system control unit 209 determines whether or not a face of the object has been detected by the object detecting unit 211. In a case where the face has been detected, the flow proceeds to step S606. On the other hand, in a case where no face has been detected, the flow proceeds to step S608. In step S606, the main frame selection area is set to the face detecting area, and the flow proceeds to step S607. In step S607, the system control unit 209 selects the main frame from the main frame selection area set in step S606 by the closest-end priority main frame selection, which will be described below, and ends the AF main frame selection process. In step S608, the system control unit 209 performs multipoint main frame selection that does not use detection information. The multipoint main frame selection can use a method of selecting a main frame in a predetermined area within the screen (image), but a detailed description will be omitted.

In step S609, the system control unit 209 determines whether or not the sports scene detected by the scene detecting unit 219 is a body priority sports scene (specific scene). Here, the specific scene is a scene in which a body of a person should be focused on, such as turning in ballet or dance, spinning in figure skating, or jumping in a gymnastics floor competition or pole vault. In a case where the sports scene is the specific scene, the flow proceeds to step S610. On the other hand, in a case where the sports scene is not the specific scene, the flow proceeds to step S612.

Here, the scene detecting unit 219 is made to perform machine learning in advance so that the sports scene can be specified from the orientation information on the object. The orientation information on the object may be, for example, a combination of the coordinate information and the direction information on the characteristic part of the object detected by the object detecting unit 211. Alternatively, the camera body 200 may include a detector that detects joint information on the object area and the detection result of the joint information may be used for the orientation information. Therefore, the camera body 200 in FIG. 1 may include the detector that detects the joint information. This detector can be created, for example, by assigning five types of joint labels of a head, a chest, a waist, above the knee, and below the knee to an image and performing machine learning. The main area detecting methods applicable to this embodiment are not limited to these methods, and another method is applicable. For example, the specific scene may be detected based on user settings (user operation of the operation unit 214).

In step S610, the system control unit 209 sets the main frame selection area to the body detecting area. Next, in step S611, the system control unit 209 selects the main frame from the main frame selection area set in step S610 by majority-decision main frame selection, which will be described below, and ends the AF main frame selection processing.

In step S612, the system control unit 209 determines whether or not the eye of the object has been detected by the object detecting unit 211. In a case where the eye has been detected, the flow proceeds to step S616. On the other hand, in a case where the eye has not yet been detected, the flow proceeds to step S613. In step S613, the system control unit 209 determines whether or not a face of the object has been detected by the object detecting unit 211. In a case where the face has been detected, the flow proceeds to step S614. On the other hand, in a case where no face has been detected, the flow proceeds to step S610.

In step S614, the system control unit 209 sets the main frame selection area to the face detecting area. Next, in step S615, the system control unit 209 selects the main frame from the main frame selection area set in step S614 by the closest-end priority main frame selection, which will be described below, and ends the AF main frame selection processing. In step S616, the system control unit 209 sets the main frame selection area, which is a target area for selecting the AF main frame, to the eye detecting area. Next, in step S617, the system control unit 209 selects the main frame from the main frame selection area set in step S616 by center priority main frame selection, which will be described below, and ends the AF main frame selection processing.

Thus, the system control unit 209 changes the selection method of the object area for acquiring the focus information (focus detecting information) from among a plurality of object areas detected by the object detecting unit 211 according to whether the specific scene has been detected (steps S609 to S617).

Center-Priority Main Frame Selection

Figure 9:
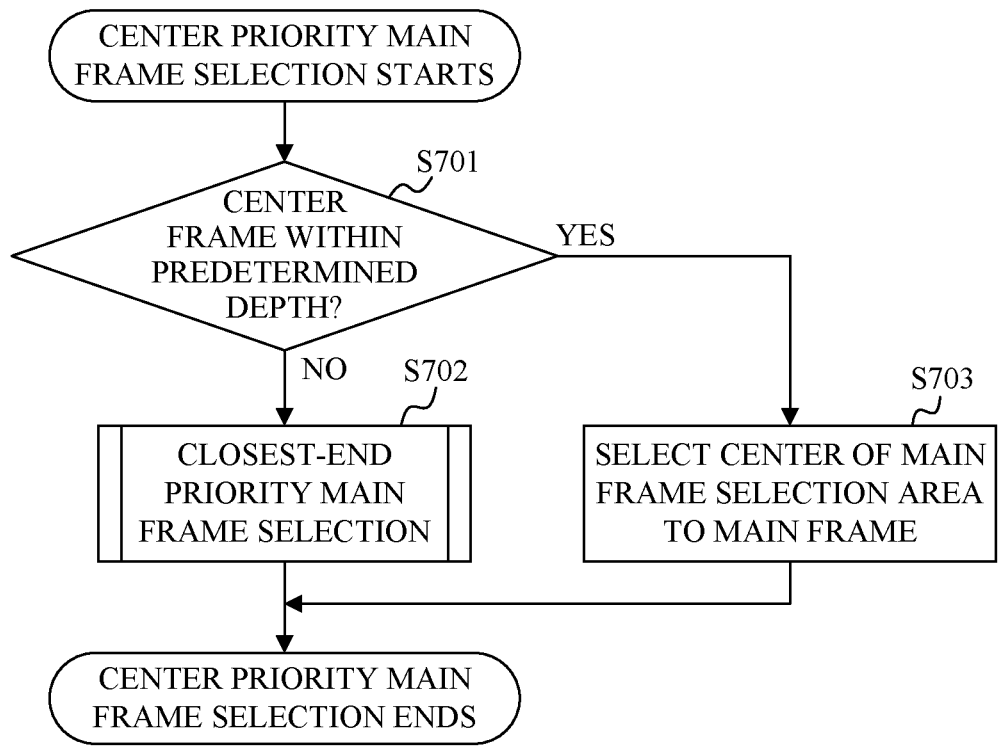
FIG. 9 is a flowchart of center priority main frame selection in this embodiment.

Referring now to FIG. 9, a description will be given of steps S604 and S617 (center priority main frame selection) in FIG. 8. FIG. 9 is a flowchart of the center priority main frame selection.

First, in step S701, the system control unit 209 determines whether or not the center (central frame) of the main frame selection area is within a predetermined depth. In a case where the center frame is within the predetermined depth, the flow proceeds to step S703. On the other hand, in a case where the center frame is not within the predetermined depth, the flow proceeds to step S702. In step S702, the system control unit 209 performs the closest-end priority main frame selection, which will be described below, and ends the center priority main frame selection processing. In step S703, the system control unit 209 sets the center (central frame) of the main frame selection area to the main frame, and ends the center priority main frame selection processing.

Closest-End Priority Main Frame Selection

Figure 10:
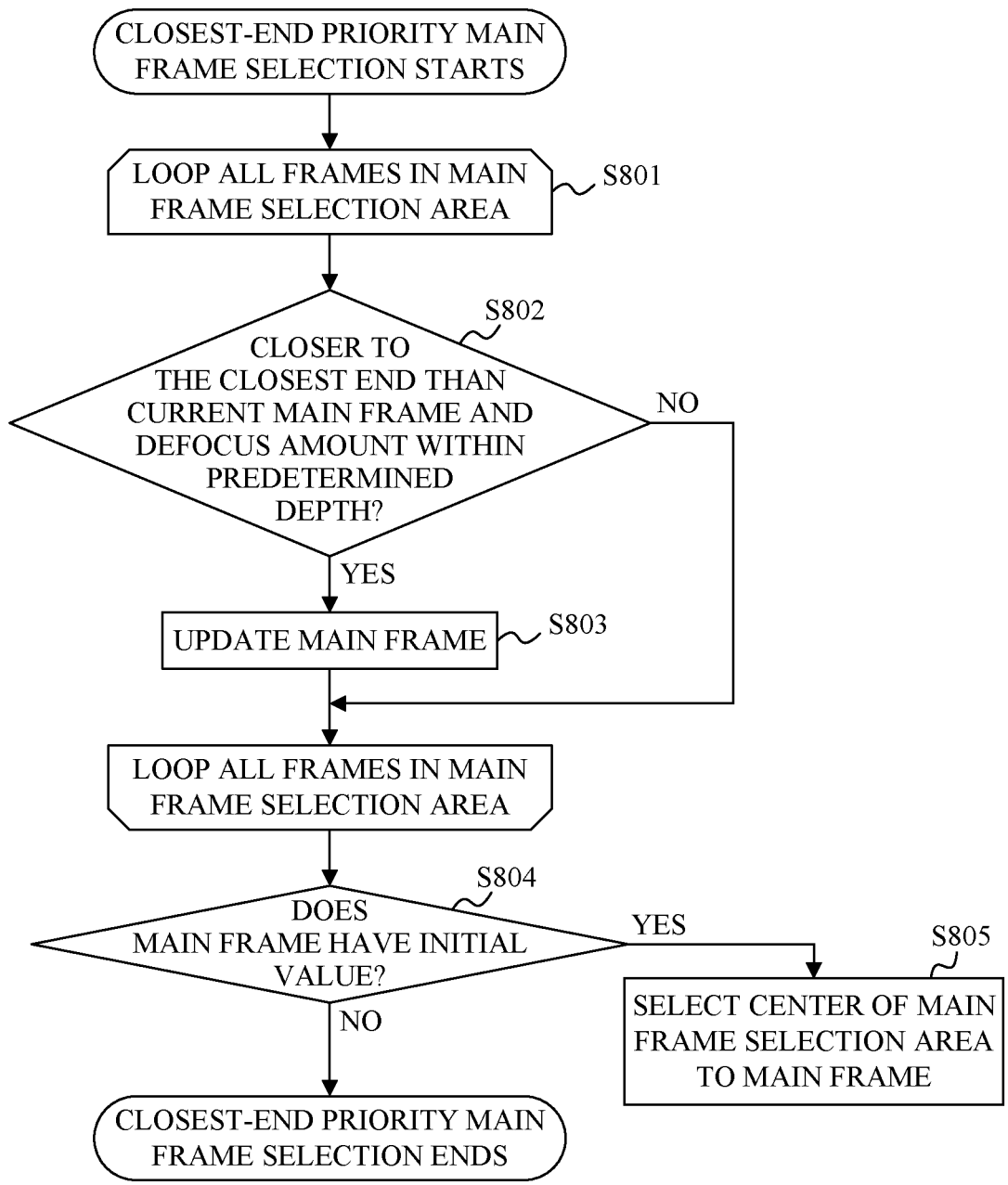
FIG. 10 is a flowchart of the closest-end priority main frame selection in this embodiment.

Referring now to FIG. 10, a description will be given of steps S607 and S615 in FIG. 8 and step S702 in FIG. 9 (the closest-end priority main frame selection). FIG. 10 is a flowchart of selecting the closest-end priority main frame.

First, in step S801, the system control unit 209 performs loop processing for all frames in order to select a main frame from the set main frame selection area. An initial value of the main frame is previously set to information (such as a total number of frames+1) that is used to determine that the main frame is not selected, and the figure is omitted. Next, in step S802, the system control unit 209 determines whether the target main frame is closer to the closest end than the selected main frame (current main frame) and the defocus amount is within a predetermined depth. In a case where the condition of step S802 is met, the flow proceeds to step S803, and the system control unit 209 updates the main frame. On the other hand, in a case where the condition of step S802 is not met, the system control unit 209 does not update the main frame.

Next, in step S804, the system control unit 209 determines whether or not the main frame has been selected by the loop of step S801 (whether or not the main frame has the initial value). In a case where the main frame could be selected, the system control unit 209 ends the closest priority main frame selection processing. On the other hand, in a case where the main frame has not yet been selected, the flow proceeds to step S805. In step S805, the system control unit 209 sets the center of the main frame selection area to the main frame, and ends the closest priority main frame selection processing.

Majority-Decision Main Frame Selection

Figure 11:
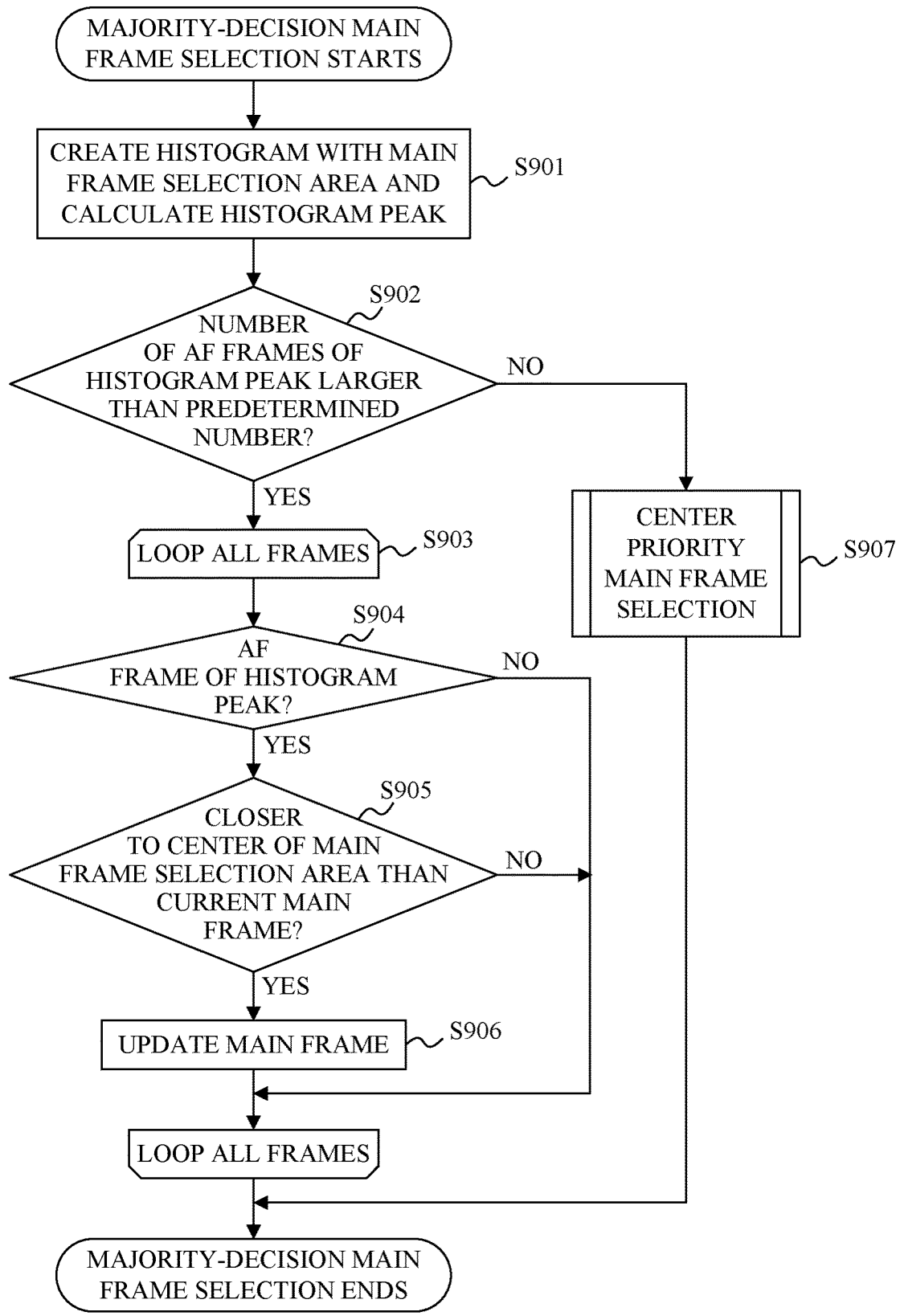
FIG. 11 is a flowchart of majority-decision main frame selection in this embodiment.

Referring now to FIG. 11, a description will be given of step S611 (majority-decision main frame selection) in FIG. 8. FIG. 11 is a flowchart for majority-decision main frame selection. This embodiment uses a histogram, which is an image analyzing unit, as a general technology, a detailed description of the histogram will be omitted.

First, in step S901, the system control unit 209 counts a defocus amount calculated for each AF frame set in the main frame selection area for each predetermined depth and creates a histogram. Next, in step S902, the system control unit 209 determines whether a peak value of the histogram created in step S901 (the number of AF frames of the histogram peak) is equal to or higher than a predetermined value. This embodiment normalizes the peak value of the histogram by the total number of AF frames, converts it into a ratio, and uses it. In a case where the peak value is equal to or higher than the predetermined ratio (the number of AF frames of the histogram peak is equal to or higher than the predetermined number), the flow proceeds to step S903. On the other hand, in a case where the peak value is lower than the predetermined ratio, the flow proceeds to step S907. In step S907, the system control unit 209 performs the center priority main frame selection illustrated in FIG. 9, and ends the majority-decision main frame selection processing.

In step S903, the system control unit 209 performs the loop processing for all frames in order to select the main frame from the main frame selection area. In step S904, the system control unit 209 determines whether the target AF frame is an AF frame counted as the histogram peak (AF frame of the histogram peak). In a case where the AF frame is the AF frame of the histogram peak, the flow proceeds to step S905. On the other hand, in a case where the AF frame is not the AF frame of the histogram peak, the loop processing of step S903 is repeated.

In step S905, the system control unit 209 determines whether the coordinates of the target main frame are closer to the center of the main frame selection area than the currently selected main frame. In a case where the condition of step S905 is met, the flow proceeds to step S906, and the system control unit 209 updates the main frame. On the other hand, in a case where the condition of step S905 is not met, the system control unit 209 does not update the main frame. In a case where the loop of step S903 ends, the system control unit 209 ends the majority-decision main frame selection processing. The main frame selection after the main frame selection area is set may be made different (changed) according to whether the object is a still object or a moving object. More specifically, in a case where the object is the still object, the area to be focused is determined based on the information on the number of areas to be focused as described above, and in a case where the object is the moving object, the area to be focused is determined based on the past focus detecting information.

Thus, the control unit (system control unit 209) in this embodiment changes the selection method of the object area for acquiring the focus information according to whether the specific scene has been detected. The object area may include a first object area and a second object area. The control unit may perform focus control based on the focus information on the first object area in a case where the specific scene has not yet been detected. On the other hand, the control unit performs focus control based on the focus information on the second object area in a case where the specific scene has been detected.

The first object area may have a higher hierarchy (priority) than that of the second object area. A ratio of the first object area to the image data is smaller than a ratio of the second object area to the image data. The first object area includes an eye or face of a person, and the second object area includes a torso or full body of the person. In the specific scene, the first object area accelerates or decelerates in a depth direction, and the second object area does not accelerate or decelerate in the depth direction. The control unit (AF signal processing unit 204) may set a plurality of divided focus detecting areas (AF frames) corresponding to the object area detected by the object detecting unit (object detecting unit 211), and detect focus information for each detecting area.

This embodiment can perform stable focus control for an object whose face and eye, which are higher detection parts (higher hierarchy, higher priority object area), move irregularly around the body. For example, this embodiment can continue to capture images of an object in an in-focus state, such as a figure skater, in which the head rotates around the body at a high speed.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-020418, filed on Feb. 14, 2022, which is hereby incorporated by reference herein in its entirety.

What is claimed is:

1. An image pickup apparatus comprising:
   an image sensor;
   at least one processor, and a memory coupled to the at least one processor, the memory having instructions that, when executed by the processor, perform operations as:
   an object detecting unit configured to detect an object area based on image data output from the image sensor;
   a scene detecting unit configured to detect a specific scene based on the image data; and
   a control unit configured to perform focus control based on focus information on the object area,
   wherein the control unit changes a selection method of the object area for acquiring the focus information according to whether the specific scene has been detected,
   wherein the object area includes a first object area and a second object area,
   wherein the control unit performs the focus control based on the focus information on the first object area in a case where the specific scene is not detected, and
   wherein the control unit performs the focus control based on the focus information on the second object area in a case where the specific scene is detected.

2. The image pickup apparatus according to claim 1, wherein the first object area has a priority higher than that of the second object area.

3. The image pickup apparatus according to claim 1, wherein a ratio of the first object area to the image data is smaller than a ratio of the second object area to the image data.

4. The image pickup apparatus according to claim 1, wherein the first object area includes an eye or face of a person, and
wherein the second object area includes a torso or full body of the person.

5. The image pickup apparatus according to claim 1, wherein in the specific scene, the first object area accelerates or decelerates in a depth direction, and the second object area does not accelerate or decelerate in the depth direction.

6. The image pickup apparatus according to claim 1, wherein the scene detecting unit detects the specific scene based on user settings.

7. The image pickup apparatus according to claim 1, wherein the control unit sets a plurality of divided focus detecting areas corresponding to the object area detected by the object detecting unit, and detects the focus information for each focus detecting area.

8. An image pickup apparatus comprising:
an image sensor;
at least one processor, and a memory coupled to the at least one processor, the memory having instructions that, when executed by the processor, perform operations as:
an object detecting unit configured to detect an object area based on image data output from the image sensor;
a scene detecting unit configured to detect a specific scene based on the image data; and
a control unit configured to perform focus control based on focus information on the object area,
wherein the control unit changes a selection method of the object area for acquiring the focus information according to whether the specific scene has been detected, and
wherein the scene detecting unit detects the specific scene based on joint information on the object area.

9. The image pickup apparatus according to claim 8, wherein the object area includes a first object area and a second object area,
wherein the first object area includes an eye or face of a person, and
wherein the second object area includes a torso or full body of the person.

10. The image pickup apparatus according to claim 8, wherein the object area includes a first object area and a second object area,
wherein the control unit performs the focus control based on the focus information on the first object area in a case where the specific scene is not detected, and
wherein the control unit performs the focus control based on the focus information on the second object area in a case where the specific scene is detected.

11. The image pickup apparatus according to claim 10, wherein the first object area has a priority higher than that of the second object area.

12. The image pickup apparatus according to claim 10, wherein a ratio of the first object area to the image data is smaller than a ratio of the second object area to the image data.

13. An image pickup apparatus comprising:
an image sensor;
at least one processor, and a memory coupled to the at least one processor, the memory having instructions that, when executed by the processor, perform operations as:
an object detecting unit configured to detect an object area based on image data output from the image sensor;
a scene detecting unit configured to detect a specific scene based on the image data; and
a control unit configured to perform focus control based on focus information on the object area,
wherein the control unit changes a selection method of the object area for acquiring the focus information according to whether the specific scene has been detected, and
wherein the scene detecting unit detects the specific scene based on machine learning.

14. The image pickup apparatus according to claim 13, wherein the object area includes a first object area and a second object area,
wherein the first object area includes an eye or face of a person, and
wherein the second object area includes a torso or full body of the person.

15. An image pickup apparatus comprising:
an image sensor;
at least one processor, and a memory coupled to the at least one processor, the memory having instructions that, when executed by the processor, perform operations as:
an object detecting unit configured to detect an object area based on image data output from the image sensor;
a scene detecting unit configured to detect a specific scene based on the image data; and
a control unit configured to perform focus control based on focus information on the object area,
wherein the control unit changes a selection method of the object area for acquiring the focus information according to whether the specific scene has been detected,
wherein the specific scene is a sports scene.

16. The image pickup apparatus according to claim 15, wherein the sports scene is at least one of turning in ballet or dance, spinning in figure skating, or jumping in a gymnastics floor competition or pole vault.

17. The image pickup apparatus according to claim 15, wherein the object area includes a first object area and a second object area,
wherein the first object area includes an eye or face of a person, and
wherein the second object area includes a torso or full body of the person.

18. The image pickup apparatus according to claim 15, wherein the object area includes a first object area and a second object area,
wherein the control unit performs the focus control based on the focus information on the first object area in a case where the specific scene is not detected, and
wherein the control unit performs the focus control based on the focus information on the second object area in a case where the specific scene is detected.

19. The image pickup apparatus according to claim 18, wherein the first object area has a priority higher than that of the second object area.

20. The image pickup apparatus according to claim 18, wherein a ratio of the first object area to the image data is smaller than a ratio of the second object area to the image data.

21. A control method of an image pickup apparatus, the control method comprising the steps of:
detecting an object area based on image data output from an image sensor;
detecting a specific scene based on the image data; and
performing focus control based on focus information on the object area,
wherein the object area includes a first object area and a second object area, wherein the focus control step performs the focus control based on the focus information of the first object area if the specific scene is not detected, wherein the focus control step performs the focus control based on the focus information on the second object area if the specific scene is detected.

22. A non-transitory computer-readable storage medium storing a program for causing a computer to execute the control method according to claim 21.

23. A control method of an image pickup apparatus, the control method comprising the steps of:
    detecting an object area based on image data output from an image sensor;
    detecting a specific scene based on the image data; and
    performing focus control based on focus information on the object area,
    wherein the focus control step changes a selection method of the object area for acquiring the focus information according to whether the specific scene has been detected,
    wherein the scene detecting step detects the specific scene based on joint information on the object area.

24. A non-transitory computer-readable storage medium storing a program for causing a computer to execute the control method according to claim 23.

25. A control method of an image pickup apparatus, the control method comprising the steps of:
    detecting an object area based on image data output from an image sensor;
    detecting a specific scene based on the image data; and
    performing focus control based on focus information on the object area,
    wherein the focus control step changes a selection method of the object area for acquiring the focus information according to whether the specific scene has been detected,
    wherein the scene detecting step detects the specific scene based on machine learning.

26. A non-transitory computer-readable storage medium storing a program for causing a computer to execute the control method according to claim 25.

27. A control method of an image pickup apparatus, the control method comprising the steps of:
    detecting an object area based on image data output from an image sensor;
    detecting a specific sports scene based on the image data; and
    performing focus control based on focus information on the object area,
    wherein the focus control step changes a selection method of the object area for acquiring the focus information according to whether the specific sports scene has been detected.

28. A non-transitory computer-readable storage medium storing a program for causing a computer to execute the control method according to claim 27.

* * * * *